US00RE35728E

United States Patent [19]

Bixby et al.

[11] E Patent Number: Re. 35,728

[45] Reissued Date of Patent: Feb. 10, 1998

[54] NON-CULTURED SIMULATED CHEESE CONTAINING RENNET CASEIN

[75] Inventors: Howard H. Bixby, Kewaunee, Wis.; William C. Haines, Manlius, N.Y.; Arnold W. Wickman, Green Bay, Wis.

[73] Assignee: Schreiber Foods, Inc., Green Bay, Wis.

[21] Appl. No.: 248,534

[22] Filed: May 24, 1994

Related U.S. Patent Documents

Reissue of:

[64] Patent No.: 4,444,800
Issued: Apr. 24, 1984
Appl. No.: 361,564
Filed: Mar. 25, 1982

U.S. Applications:

[63] Continuation of Ser. No. 814,194, Dec. 20, 1991, abandoned, which is a continuation of Ser. No. 64,192, Jun. 19, 1987, abandoned, which is a continuation of Ser. No. 122,512, Feb. 19, 1980, abandoned, which is a continuation of Ser. No. 877,071, Feb. 14, 1978, abandoned, which is a continuation-in-part of Ser. No. 772,567, Feb. 28, 1977, abandoned.

[51] Int. Cl.[6] ..... A23C 20/00; A23J 1/20

[52] U.S. Cl. ..... 426/582; 426/657

[58] Field of Search ..... 426/36, 580, 582, 426/583

[56] References Cited

U.S. PATENT DOCUMENTS

| | | | |
|---|---|---|---|
| 397,926 | 8/1889 | Galal | 426/582 |
| 515,736 | 3/1894 | Angus | 426/582 |
| 1,368,624 | 2/1921 | Garstin | 426/334 |
| 1,389,095 | 8/1921 | Carpenter | 426/334 |
| 1,389,577 | 9/1921 | Carpenter | 426/334 |
| 1,634,410 | 7/1927 | Eldredge | 426/582 |
| 1,737,770 | 12/1929 | Parsons | 426/582 |
| 1,890,948 | 12/1932 | Pasternack | 99/11 |
| 2,011,074 | 8/1935 | Pasternack | 99/11 |
| 2,081,273 | 5/1937 | Guttenberg | 99/162 |
| 2,103,304 | 12/1937 | Teller | 99/117 |
| 2,163,778 | 6/1939 | Draisbach | 99/162 |
| 2,604,405 | 7/1952 | Peterson | 99/116 |
| 2,928,746 | 3/1960 | Donohue | 99/123 |
| 2,961,320 | 11/1960 | Cuthbertson | 99/56 |
| 2,982,654 | 5/1961 | Hammond | 99/116 |
| 3,097,949 | 7/1963 | Lauck | 99/115 |
| 3,244,535 | 4/1966 | Lauck | 99/117 |
| 3,310,406 | 3/1967 | Webster | 99/1 |
| 3,389,131 | 6/1968 | Van Horn | 260/119 |
| 3,391,002 | 7/1968 | Little | 99/54 |
| 3,397,994 | 8/1968 | Elentogen | 99/116 |
| 3,437,494 | 4/1969 | Loter | 99/144 |
| 3,455,698 | 7/1969 | Vakaleris | 99/94 |
| 3,520,699 | 7/1970 | Henning | 99/140 |
| 3,560,220 | 2/1971 | Bangert | 99/63 |
| 3,563,761 | 2/1971 | Ellinger | 99/63 |
| 3,579,354 | 5/1971 | Kasik | 99/116 |
| 3,615,661 | 10/1971 | Ellinger | 99/54 |
| 3,615,662 | 10/1971 | Ellinger | 99/54 |
| 3,620,757 | 11/1971 | Ellinger | 99/54 |
| 3,635,737 | 1/1972 | Baron | 99/140 R |
| 3,674,508 | 7/1972 | Kasik | 99/140 R |
| 3,694,219 | 9/1972 | Glandorf | 99/1 |
| 3,712,865 | 1/1973 | Evans | 252/312 |
| 3,726,960 | 4/1973 | Bell | 423/306 |
| 3,728,127 | 4/1973 | Palmer | 99/20 |
| 3,729,325 | 4/1973 | Howard | 99/123 |
| 3,729,326 | 4/1973 | Kasik | 99/140 R |
| 3,729,546 | 4/1973 | Bell | 423/306 |
| 3,741,774 | 6/1973 | Hartwood | 99/117 |
| 3,782,971 | 1/1974 | van Roon | 426/185 |
| 3,806,606 | 4/1974 | Selden | 426/188 |
| 3,810,997 | 5/1974 | Chien | 426/205 |
| 3,843,808 | 10/1974 | Ziccarelli | 426/187 |
| 3,843,828 | 10/1974 | Arndt | 426/360 |
| 3,885,048 | 5/1975 | Liggett | 426/18 |
| 3,886,294 | 5/1975 | Emodi | 426/540 |
| 3,886,300 | 5/1975 | Fujii | 426/656 |
| 3,891,778 | 6/1975 | Boyer | 426/573 |
| 3,922,374 | 11/1975 | Bell | 426/582 |
| 3,930,958 | 1/1976 | Kumar | 426/656 |
| 3,941,891 | 3/1976 | Kasik | 426/94 |
| 3,971,854 | 7/1976 | Kasik | 426/573 |
| 4,012,534 | 3/1977 | Kichline | 426/582 |
| 4,016,298 | 4/1977 | Kasik | 426/94 |
| 4,031,254 | 6/1977 | Kasik | 426/573 |
| 4,055,555 | 10/1977 | Badertscher | 260/119 |

(List continued on next page.)

FOREIGN PATENT DOCUMENTS

| | | |
|---|---|---|
| 2058207 | 11/1970 | Germany . |
| 2342299 | 8/1973 | Germany . |
| 490022 | 6/1970 | Switzerland . |
| 2 082 890 | of 0000 | United Kingdom . |

OTHER PUBLICATIONS

Edwin J. Cohn and Ruth E.L. Berggren, Studies In The Physical Chemistry Of The Proteins, Aug. 4, 1924, pp. 45–79.

Frank A. Lee, Ph.D., Basic Food Chemistry, 1975, pp. 256–257.

Frank Kosikowski, Cheese and Fermented Milk Foods, 1977, pp. 186–203 and appendix.

Chemical Abstracts, Biochemistry section of vol. 75 (1971) p. 259.

*Primary Examiner*—David M. Naff
*Attorney, Agent, or Firm*—Steven P. Shurtz; Brinks Hofer Gilson & Lione

[57] ABSTRACT

A cheese-like product is derived from dry rennet casein and generally exhibits the body, texture and eating quality of cheese. The cheese-like product is a substantially homogeneous mass (of predetermined consistency and contains all least about 25 percent by weight of previously dry but solvated edible rennet casein as the principal protein source, a solvation agent and water. A bland edible oil or fat and a suitable flavoring agent (or agents) can be present in quantities sufficient to impart to the product the characteristic fat content and flavor of the desired cheese analog. A coloring agent may also be present. The cheese-like product is produced by the direct conversion of dry, particulate rennet casein to a substantially homogeneous mass of cheese-like consistency at an elevated temperature.

44 Claims, No Drawings

U.S. PATENT DOCUMENTS

| | | | |
|---|---|---|---|
| 4,061,794 | 12/1977 | Charles | 426/486 |
| 4,066,800 | 1/1978 | Rosenan | 426/332 |
| 4,075,360 | 2/1978 | Rule | 426/582 |
| 4,096,586 | 6/1978 | Badertscher | 366/136 |
| 4,104,413 | 8/1978 | Wynn | 426/582 |
| 4,110,484 | 8/1978 | Rule | 426/582 |
| 4,152,101 | 5/1979 | Charles | 425/85 |
| 4,168,322 | 9/1979 | Buckley | 426/250 |
| 4,169,160 | 9/1979 | Wingerd | 426/40 |
| 4,182,777 | 1/1980 | Saunders | 426/62 |
| 4,197,322 | 4/1980 | Middleton | 426/36 |
| 4,213,896 | 7/1980 | Davis | 260/119 |
| 4,822,623 | 4/1989 | Middleton | 426/39 |

NON-CULTURED SIMULATED CHEESE CONTAINING RENNET CASEIN

Matter enclosed in heavy brackets [ ] appears in the original patent but forms no part of this reissue specification; matter printed in italics indicates the additions made by reissue.

CROSS REFERENCE TO RELATED APPLICATION

This *application is a continuation of Ser. No.* 07/814,194, filed Dec. 20, 1991, now abandoned, which is a continuation of Ser. No. 07/064,192, filed Jun. 19, 1987, now abandoned, which is a Reissue of Ser. No. 06/361,564, filed Mar. 25, 1982, now U.S. Pat. No. 4,444,800, which is a continuation of [copending application] Ser. No. 06/122,512, filed [on] Feb. 19, 1980, now abandoned, which [was]*is* a continuation of [copending application] Ser. No. 05/877,071, filed [on] Feb. 14, 1978, now abandoned, which [was] *is* a continuation-in-part of [copending application] Ser. No. 05/772,567, filed [on] Feb. 28, 1977, now abandoned.

BACKGROUND OF THE INVENTION

This invention relates to cheese-like products and to a method for direct fabrication of such products.

Imitation cheese products have been produced from a variety of protein sources such as cottage cheese curd, milk solids, skim milk solids and the like. In many instances the above protein sources have been combined with minor amounts of the cheese being simulated and act as an extender therefor.

In recent years, alkali or alkaline earth metal caseinates, which are valuable sources of protein, also have been used in the production of process cheese products as is illustrated by U.S. Pat. No. 3,922,374 to Bell et al. However, such caseinates sometimes possess an objectionable odor and flavor which can override the intended flavor of the product food products.

Some relatively bland caseinates have been produced by heating a casein solution with an alkali metal or an alkaline earth metal salt in a manner which causes coagulation of the protein. The resulting coagulum is separated from a continuous liquid phase, and, after washing, is a substantially bland alkali or alkaline earth metal caseinate. Sodium caseinate, calcium caseinate and sodium-calcium caseinate have been employed heretofore for the production of simulated process cheese products. Nevertheless, a number of problems are inherent in the use of such materials. For example, in some instances sodium caseinate is unsatisfactory in imitation cheese products because such imitation cheese products have a tendency toward burning and puffing if baked or toasted, for example, on pizzas or on open-faced, toasted sandwiches. However, caseinates are often used as extenders in simulated dairy products so that smaller amounts of the more expensive natural ingredient can be utilized in the product.

Another drawback of caseinates is that they are relatively expensive and tend to develop objectionable flavors and odors.

Wet mass rennet casein (e.g., cottage cheese curd) also been used to manufacture cheese products; however, it is a perishable item and suffers from the problems of spoilage, inconvenient handling and storage.

German Patent Publication (Offenlegungsshrift) No. 23 42 299 discloses a cheese processing additive that can contain up to 20 weight percent of rennet casein and that can be added to crude cheese in an amount sufficient to supply 1 to 3 weight percent of rennet casein. However, the rennet casein content of this processing additive is low, and a very large amount of a phosphate salt (50 to 100 weight percent, based on weight of rennet casein) is used to produce the additive.

Accordingly, there has been a longstanding need for an inexpensive protein source which can be utilized as the principal protein source to produce a satisfactory food product and which can be used, if necessary, as the sole protein source in a cheese analog or cheese-like product. It has now been found that a non-cultured, cheese-like product can be prepared using dry, particulate rennet casein as the principal, or sole, protein source of the product, notwithstanding the known relatively low solubility of rennet casein in aqueous systems.

SUMMARY OF THE INVENTION

The present invention contemplates solvation of dry particulate rennet casein in water in the presence of an edible solvation agent to produce a paste-like mass predetermined consistency. At least about 25 percent by weight of the paste-like mass is constituted by previously dry, edible rennet casein. The paste-like mass contains an edible lipid material and suitable flavoring agents characteristic of the desired cheese analog.

The important factors of the direct fabrication of cheese analogs according to the present process are the relative amounts of the dry rennet casein, the solvation agent, and water. The manner in which these components are combined to constitute the mixture that is subjected in the heat treatment can be varied to provide various textures and products. The individual components can be premixed, mixed in the cooker, or a combination of the foregoing procedures can be utilized. The nature of the heat treatment and agitation to which the foregoing components are subjected during processing also have a bearing on the obtained product.

The cheese-like product of this invention is based a substantially homogeneous mass comprising at least about 25 percent by weight of previously dry but solvated edible rennet casein as the principal protein source, a solvation agent and water. A bland edible lipid material, i.e., an edible oil or fat, and a suitable flavoring agent (or agents) can be present in quantities sufficient to impart to the product the characteristic fat content and flavor of the desired cheese analog. A coloring agent usually is also present. Salt and other protein constituents can be added as desired.

In the process of this invention, the dry, particulate rennet casein is solvated or hydrated at an elevated temperature with sufficient water to produce a paste-like mass having no discernible unsolvated rennet casein particles present. The solvation is carried out with agitation in the presence of a solvation agent and at a temperature of about 150° F. to about 300° F., preferably at about 190° F., to about 205° F. The time period during which solvation of the rennet casein is completed is about 30 seconds to about 10 minutes, preferably about 2 to about 4 minutes.

The produced cheese analog or non-dairy but cheese-like product can be cast into loaves, sliced, or shaped into other packaging configurations as desired.

DETAILED DESCRIPTION OF THE PREFERRED EMBODIMENTS

More specifically, a non-cultured cheese analog embodying this invention is a smooth, homogeneous plastic or non-plastic mass wherein the principal, and in many instances the sole, protein source for the cheese analog is previously dry but now solvated edible rennet casein, present in an amount of at least about 25 percent by weight of the total product. The rennet casein content can be as high as about 65 percent by weight, or higher, if desired, as long as the produced mass is substantially homogeneous and no visually observable, discrete rennet casein particles are present. Preferably the rennet casein content is about 30 percent to about 45 percent by weight.

Rennet casein is a commercially available edible milk protein product which contains more of the milk minerals than does acid casein. Typically, edible rennet casein is isolated by methods well known in the art from fresh pasteurized skim milk of relatively low content by precipitation with a rennet-type enzyme of the type used in cheese-making. The precipitating enzyme can be of either animal or microbial origin. The precipitated rennet casein is then washed, pressed, dried, ground, sieved and blended to provide a substantially uniform, particulate product.

It is preferred to use a dry, particulate rennet casein having a lactose content of about 0.1 percent to about 0.3 percent by weight and having a particle size of approximately 30 mesh. Preferably, the ash content of the dry, particulate rennet casein that is used as the starting material is at least about 6 wt.-%, and more preferably about 7.5 wt.-%. One commercial source of suitable dry, particulate, edible rennet casein is New Zealand Milk Products, Inc., 6300 River Road, Rosemoat, Ill. A typical batch of this particular edible rennet casein has the following analysis:

| | wt. % |
|---|---|
| Moisture | 11.0 |
| Protein (N × 6.38) | 80.6 |
| Milkfat | 0.5 |
| Lactose | 0.1 |
| Mineral salts (ash) | 7.8 |
| | 100.0 |
| pH | 7.1 |
| Minerals and trace elements | |
| Calcium | 2.7–1.0 |
| Phosphorus | 1.3–1.4 |
| Magnesium | 0.10–0.12 |
| Sodium | 0.01–0.05 |
| Potassium | 0.01–0.04 |
| Iron | 2–6 mg/kg |

The term "solvated " as used herein and in the appended claims characterizes previously dry, edible rennet casein that has been hydrated at an elevated temperature and dispersed in an aqueous system as a solution or a gel.

The dry rennet casein has a number of advantages as the protein source. It is relatively inexpensive, and, because of its dry form, can be stored for long periods of time without spoilage or loss of flavor which is a problem with caseinates, cottage cheese curd, milk solids and other typical protein components of currently available process cheese products, many of which cannot be used as the sole protein source. However, heretofore it was not known how to produce stable aqueous systems having a relatively high rennet casein content, i.e., a rennet casein content in excess of about 20 weight percent.

Neither enzymes nor microorganisms are employed in the production of imitation non-cultured, cheese-like products of this invention, thus the present invention provides a relatively simple, economical process of relatively short duration to produce a superior non-cultured, non-dairy, cheese-like product. The product of this invention can be made at a much lower cost than currently available imitation cheese products.

Furthermore, by direct processing, i.e., by the direct conversion of dry, particulate edible rennet casein according to the method of this invention, a simulated non-cultured cheese-like product which closely resembles a natural cheese in body, texture and flavor characteristics can be obtained. Thus the present invention has provided a relatively simple, but economical and superior advance in the art of cheese analogs and their formulation.

The lipid material, i.e., the fat or oil, portion of the produced edible composition may be constituted by any edible fat or oil having a clean, bland flavor and preferably melting at a temperature of about 50° F. to about 100° F., more preferably at about 90° F. to about 95° F. The solid fat index of the oil at 92° F. preferably is less than about 6, and more preferably about 0. The preferred oils or fats for the present purposes are animal fat such as milk fat, hydrogenated or partially hydrogenated vegetable oils such as coconut oil, corn oil, palm oil, soybean oil, cottonseed oil, safflower oil or mixtures such as soybean-cottonseed oil blends, and the like. The oil or fat portion constitutes at least about 7 percent by weight, usually about 7 to about 55 percent by weight of the total product composition, and preferably from about 20to about 30 percent by weight thereof, depending on the type of cheese analog that is produced.

Edible solvation agents such as the phosphate or citrate salts capable of sequestering the calcium present in the dry, particulate rennet casein are employed in amounts of about 2 to about 12 percent by weight of the rennet casein present, depending on the desired body and texture of the cheese-like product. However, if the solvation agent content is less than about 2 percent, incomplete solvation and excessive syneresis will occur, On the other hand, a solvation agent content in excess of about 12 percent by weight produces no additional benefits.

At a relatively high edible solvation agent content, i.e., at about 8 to about 12 weight percent, based on the weight of rennet casein present, solvation provides a homogeneous plastic mass that has a smooth, uniform body like that of process cheese and is free flowing at elevated temperatures. At an intermediate edible solvation agent content of about 4 to about 8 weight percent, based on the weight of rennet casein present, a relatively long or semi-plastic body is obtained for the solvated rennet casein mass. Similarly, at a relatively low solvation agent content of about 2 to about 4 weight percent, based on the weight of the rennet casein present, a relatively short body, exhibiting some brittleness, is obtained.

Suitable phosphate-containing solvation agents include edible salts such as the alkali metal phosphates. e.g., disodium phosphate, trisodium phosphate, sodium hexamethaphosphate, sodium tripolyphosphate, tetrasoduim phosphate, dipotassium phospha monosodium diphosphate, disodium diphosphate trisodium diphosphate, tetrasodium diphosphate and the like, the sodium aluminum phosphates, and mixtures thereof. A preferred phosphate-containing solvation agent for the production of simulated process cheese is a mixture of trisodium phosphate and disodium phosphate in a weight ratio of about 1:1.5, the mixture being present in an amount of about 8 to about 12 percent by weight of rennet casein, depending on the desired degree of plasticity for the body thereof. Another preferred solvation agent is an autogeneous mixture of an alkaline sodium aluminum phosphate having approximate empirical formula $Na_8Al_2(OH)_2(PO_4)_4$ with about 30 weight percent of dibasic sodium phosphate. Suitable citrate-containing solvation agents include, for example, monosodium citrate, disodium citrate, trisodium citrate, and the like. Other solvation agents, e.g., chelating agents, sequestrants, or the like, can also be used.

Water is present in an amount of at least about 35 to about 300 percent, based on the amount of rennet casein present, and generally constitutes about 30 to about 60 percent by weight of the composition, depending upon the desired consistency. Water can be added during the premixing and cooking stages of the manufacturing process of this invention. The water that is present serves a two-fold purpose, namely, solvation of the rennet casein and control of consistency. If too much water is added, the resulting solvated mass becomes too fluid and no longer resembles the body of a cheese.

Starter distillate, an acidulant, and salt are generally added for flavoring. The normal pH for the product obtained after cooking and without an acidulant present is approximately 7, therefore, an acidulant such as lactic acid or the like is used in flavoring the cheese-like product and at the same time lowers the pH of the final product to a desired pH value of about 5.4 to about 6.5, for a process cheese-like product preferably about 5.5 to about 5.8.

Since both dry, particulate rennet casein and edible oils are bland in flavor, it is desirable to add a small amount of a flavoring agent such as starter distillate, natural cheese flavors, or artificial cheese flavors. Starter distillate is a standard commercial product which is widely used by dairy product manufacturers to add flavor to butter, margarine and cheese, and to fortify the flavor of cultured buttermilk and other dairy products, and is equally well suited for use in the present cheese-like components. Starter distillate is made by culturing a buttermilk starter to a rich flavor and aroma and then distilling the volatile flavor constituents therefrom with steam and under very accurate controlled conditions. For the products of the present invention using a standard commercially available single-strength starter distillate as the principal flavoring agent, desired flavor effect is achieved when the flavoring agent reaches a concentration of about 0.3 to about 0.5 percent by weight, preferably about 0.35 to about 0.4 percent by weight of the ultimate composition.

Alternatively, the chief component or components of starter distillate may be added in their pure form. For example, diacetyl (i.e., 2,3-butane-dione) is the chief flavor component of starter distillate and may be added alone, or together with the acidulant (e.g., lactic acid, citric acid, glucono-delta-lactone, hydrochloric acid, or the like) to achieve a flavoring agent concentration of from about 10 to about 1500 parts per million parts of the ultimate product. Other flavoring and/or acidifying agents that may be added are acetic acid, butyric acid, propionic acid, etc., i.e., $C_1$–$C_8$ carboxylic acids or mixtures thereof. In addition, artificial flavoring agents and/or spices may be used in appropriate amounts to supplement or replace the starter distillate components entirely. However, the preferred flavoring agent is starter distillate, which, in combination with desired levels of salt and acidulant, impart a pleasing flavor that closely approximates the flavor of cheese.

The method of making a simulated, non-cultured cheese-like product directly from rennet casein according to the practice of this invention can include premixing of the dry rennet casein, solvation agent, and water in an amount which constitutes a major portion of the total water content of the ultimately produced product, with or without the lipid material or flavoring agents present, or the ultimate food product constituents can be mixed within the processing vessel. Thereafter, the produced admixture, containing a portion of the remaining water, is agitated and heated to a temperature of at least about 150° F. and up to about 300° F., preferably about 190° F. to about 205° F. at atmospheric pressure, and held at that temperature until the rennet casein present is solvated and a smooth mass is achieved, preferably for about 30 seconds to about 10 minutes, and more preferably for about 2 to about 4 minutes. At temperatures above the boiling point of water, processing can be carried out in a suitable pressure vessel. The remainder of the water to the admixture can be furnished via the steam and/or water separately introduced into the cooker before or during the cooking step, depending on the type of cooker that is being used. The produced smooth mass containing solvated rennet casein as the principal protein source is then formed into the desired product shape. In instances where the cooking is done by direct steam, the condensate obtained from the steam supplies the water necessary to bring the water content of the ultimate product to the desired value. If indirect heating is used, more water is added to the cooker during the cooking operation.

For cheese analogs have a relatively high solvated rennet casein content, i.e., above about 50 percent by weight of the composition, it is preferable to add the dry rennet casein to hot water gradually over a period of time.

Premixing of the aforementioned ingredients is not always necessary, however. As pointed out hereinabove, all or a portion of the ingredients can be blended together in the cooker, if desired.

It is important to agitate the admixture of ingredients during heating. Moreover, severity of agitation at processing temperature can be used to further adjust the body of the ultimately produced cheese analog. For instance, a relatively high shear agitation is desirable for a plastic body such as that for a process cheese analog. On the other hand, for a cheese analog having a relatively short body, e.g., blue cheese or feta cheese, less severe agitation is normally used.

The following examples further illustrate this invention.

EXAMPLE 1

Preparation of Non-Dairy Premix

Dry, particulate edible rennet casein (about 297.5 lbs.) was combined in a blender with trisodium phosphate (about 11 lbs., 10 oz.), disodium phosphate (about 17 lbs., 12 oz.), salt (about 17 lbs., 6 oz.), process cheese color (carotenal No. 73; about 350 ml.), water (about 308 lbs., 8 oz.), coconut oil (about 218 lbs.), lactic acid (about 12 lbs., 8 oz.; about 4625 ml.), starter distillate (about 3 lbs., 7 oz; about 1544 ml.). The premix ingredients were then mixed for about 3 minutes to achieve a substantially uniform blend which can be used as a premix for the manufacture of cheese-like products.

EXAMPLE 2

Preparation of Simulated Non-Cultured Process Cheese Product

An aliquot of pre-blended non-dairy premix (about 410 pounds) produced in accordance with the method of Example 1 was fed into a Rietz direct steam cooker to which had been previously added about 5 pounds of water. Steam feed to the cooker was partially turned on before the non-dairy premix was fed into the cooker. After the non-dairy premix was introduced into the cooker, the entire steam feed that was available was fed into the cooker. As soon as the mixture in the cooker began to backsplash, the steam feed was cut to about one-half of the original volumetric rate and the mixture was cooked at a temperature of about 195° F. The steam feed was then shut off and additional water (about 7.5 lbs.) was stirred into the mixture in the cooker together with sufficient acidulant to provide a pH of about 5.7 for the product. Thereafter, the cooked mixture was discharged into a suitable finish processing apparatus for packaging of the produced process cheese analog.

EXAMPLE 3

Preparation of Simulated American Cheese Product

Dry, particulate edible rennet casein (about 220 lbs.), sodium citrate (about 18 lbs.), trisodium phosphate (about 6 lbs.), salt (about 11.5 lbs.), and water (about 267 lbs.) were placed in a blender and mixed at ambient conditions until a substantially homogeneous blend was obtained. A mixture of partially hydrogented cottonseed oil and partially hydrogenated soybean oil (about 160.5 lbs) was then stirred into the previously introduced blend and thereafter citric acid (about 9.7 lbs.), carotenal No. 73 color (about 0.6 lbs.), starter distillate (about 2.5 lbs.), de-lactosed whey (about 1.9 lbs.), mustard (about 1.9 lbs.), and a vitamin-mineral premix (Hoffman-LaRoche TSD 72676, about 81 grams) were mixed into the produced blend and the mixing continued for about three minutes.

The resulting admixture was then barreled off into finished cook weight of bout 450) lbs., ground, and fed into a Rietz direct steam cooker. Steam was then fed into the cooker until the cooker contents reached a temperature of about 195° F. Thereafter the cooker contents was turned for about three minutes while being cooked at about this temperature.

The cooked contents of the Rietz direct steam cooker was then extruded into individually wrapped slices and cooled to ambient temperature. A simulated American cheese product having a pH of about 5.5 to 5.6 was obtained.

EXAMPLE 4

An Edible Cheese Analog

To water (about 26.4 kg.) in a blender were added disodium phosphate (about 2 kg.) and sodium chloride (about 4 kg.), and dissolved therein. Dry, particulate edible rennet casein (about 30.8 kg.) was thereafter stirred into the resulting solution followed by vegetable oil (about 25 kg.), flavoring agents, and glucono-delta-lactone (about 3 kg.). The resulting admixture was then thoroughly agitated until substantially homogeneous, fed to a direct steam cooker, and cooked therein at about 170° F. to about 180° F. for about three minutes.

A smooth, fluid mass was obtained, which was then filled into containers and rapidly cooled to ambient temperature. The ultimately obtained edible product was cheese-like in appearance and taste, and exhibited a relatively short, somewhat brittle body.

EXAMPLE 5

Preparation of Solvated Rennet Casein

Dry, particulate edible rennet casein was admixed with water and with disodium phosphate (DSP) as the solvation agent to provide one-kilogram batches that were individually processed in a double boiler capable of heating the contents thereof to a temperature of about 190° F. to about 200° F. (Runs A–C). In Runs D–F a portion of the rennet casein was added gradually during the course of heating to maximum temperature.

The boiler contents in each instance was then agitated with a portable agitator having a variable speed drive. Each batch was held at the maximum attainable boiler temperature for about 2 to 3 minutes while being agitated and then cooled. All batches were subjected to about the same degree of agitation.

The experimental results are compiled in Table I, below.

TABLE I

| | Run | | | | | |
|---|---|---|---|---|---|---|
| Ingredient, wt. % | A | B | C | D | E | F |
| rennet casein | 30 | 40 | 50 | 55 | 60 | 65 |
| DSP | 2.4 | 3.2 | 4 | 4.4 | 4.8 | 5.2 |
| water | 67.6 | 56.8 | 46 | 40.6 | 35.2 | 29.8 |

In all instances the obtained mass was completely homogeneous. As the rennet casein content was increased, the obtained mass became more translucent and the flowability of the mass upon cooling changed from that of a semi-solid paste to a hard mass.

EXAMPLE 6

Solvation of Rennet Casein at Varying Solvation Agent Concentrations

Dry, particulate edible rennet casein was solvated in a manner similar to Example 5 with varying amounts disodium phosphate (DSP) as the solvation agent. The body of the obtained mass was evaluated in the hot state in each instance. The experimental results are compiled in Table II, below.

TABLE II

| | Run | | | | | |
|---|---|---|---|---|---|---|
| Ingredient, wt. % | G | H | I | J | K | L |
| rennet casein | 25 | 25 | 25 | 25 | 25 | 25 |
| water | 74.5 | 74.25 | 74 | 73.5 | 73 | 72 |
| DSP[1] | 0.5 | 0.75 | 1 | 1.5 | 2 | 3 |
| DSP[2] | 2 | 3 | 4 | 6 | 8 | 12 |

[1]based on total weight of composition
[2]based on weight of rennet casein

In Run G, the obtained mass had the appearance of fresh curd; some particulate rennet casein was also observed to be present.

In Run H, the mass had a smooth body with some stretchiness.

In Run I, the mass had a stringy body.

In Run J, the mass exhibited a lower viscosity and less stringiness than the mass of Run I.

In Run K, the mass was quite thin and had a plastic, almost process cheese-like body with very little stringiness.

In Run L, the mass was very plastic and had a process cheese-like body.

The foregoing specification and the examples are intended as illustrative and are not to be taken as limiting. Still other variations and modifications within the spirit and scope or the present invention are possible and will readily present themselves to one skilled in the art.

We claim:

1. A substantially homogeneous, aqueous, edible mass [which comprises] *consisting of* solvated edible rennet casein [as the principal protein source] prepared by solvation of dry particulate rennet casein in water in the presence of an edible solvation agent at a temperature of about 190° F. to about 205° F. and under high shearing agitation at the temperature of solvation for a time period of about 2 minutes to about 4 minutes to provide a plastic body to said edible mass, said particulate rennet casein constituting at least 25 percent by weight of said edible mass, water, and said edible solvation agent being present in an amount of about 2 to about 12 percent by weight of the particulate rennet casein, said edible solvation agent being selected from the group consisting of disodium phosphate, trisodium phosphate, sodium hexametaphosphate, sodium tripolyphosphate, tetrasodium phosphate, the sodium aluminum phosphates, dipotassium phosphate, monosodium diphosphate, trisodium diphosphate, tetrasodium diphosphate, monosodium citrate, disodium citrate, trisodium citrate and mixtures thereof, said edible mass being substantially free of discernible rennet casein particles.

2. The edible mass in accordance with claim 1 wherein the rennet casein is present in an amount of about 25 percent to about 65 percent by weight.

3. A substantially homogeneous, aqueous, edible mass [which comprises] *consisting of* solvated edible rennet casein [as the principal protein source] prepared by solvation of dry particulate rennet casein in water in the presence of an edible solvation agent at a temperature of about 190° F. to about 205° F. and under high shearing agitation at the temperature of solvation for a time period of about 2 minutes to about 4 minutes to provide a plastic body to said edible mass, said particulate rennet casein constituting about 30 percent to about 45 percent by weight of said edible mass, water, and said edible solvation agent being present in an amount of about 2 to about 12 percent by weight of the particulate rennet casein, said edible solvation agent being selected from the group consisting of disodium phosphate, trisodium phosphate, sodium hexametaphosphate, sodium tripolyphosphate, tetrasodium phosphate, the sodium aluminum phosphates, dipotassium phosphate, monosodium diphosphate, trisodium diphosphate, tetrasodium diphosphate, monosodium citrate, disodium citrate, trisodium citrate and mixtures thereof said edible mass being substantially free of discernible rennet casein particles.

4. A non-cultured simulated cheese *food* product having generally the texture, body and eating quality of cheese which is a substantially homogeneous mass comprising solvated edible rennet casein as the principal protein source, said solvated edible rennet casein having been prepared by solvation of dry particulate rennet casein in water in the presence of an edible solvation agent at a temperature of about 190° F. to about 205° F. and under high shearing agitation at the temperature of solvation for a period of time of about [2] *3* minutes [to about 4 minutes] to provide plastic body to said food product, said particulate rennet casein constituting about 30 percent to about 45 percent by weight of said simulated cheese, said edible solvation agent being selected from the group consisting of disodium phosphate, trisodium phosphate, sodium hexametaphosphate, sodium tripolyphosphate, tetrasodium phosphate, the sodium aluminum phosphates, dipotassium phosphate, monosodium diphosphate, trisodium diphosphate, tetrasodium diphosphate, monosodium citrate, disodium citrate, trisodium citrate and mixtures thereof, and being present in an amount of about 2 to about 12 percent by weight of said particulate rennet casein, water, a bland, edible lipid material selected from the group consisting of oil and fat, and sufficient quantities of suitable flavoring agents to impart the desired flavor, said food product being substantially free of unsolvated rennet casein particles.

5. A simulated, non-cultured food product having a body, texture and eating quality substantially that of process cheese which food product comprises solvated edible rennet casein as the principal protein source, said solvated edible rennet casein having been prepared by solvation of dry particulate rennet casein in water in the presence of an edible solvation agent at a temperature of about 190° F. to about 205° F. and under high shearing agitation for a time period of about [2] *3* minutes [to about 4 minutes] to provide a plastic body to said food product, said particulate rennet casein constituting about 25 percent to about [65] *60* percent by weight of said food product, about 7 percent to about 55 percent by weight of an edible oil having a melting point of about 50° F. to about 100° F., said edible solvation agent being selected from the group consisting of disodium phosphate, trisodium phosphate, sodium hexametaphosphate, sodium tripolyphosphate, tetrasodium phosphate, the sodium aluminum phosphates, dipotassium phosphate, monosodium diphosphate, trisodium diphosphate, tetrasodium diphosphate, monosodium citrate, disodium citrate, trisodium citrate and mixtures thereof, and being present in an amount of about 8 percent to about 12 percent by weight of said particulate rennet casein, about 0.3 percent to about 0.5 percent by weight of starter distillate, about 30 percent to about 60 percent by weight of water, and sufficient acidulant to provide a pH of about 5.5 to about 5.8 in the food product, said food product being substantially free of unsolvated rennet casein particles.

6. The food product of claim 5 wherein said edible oil is a hydrogenated vegetable oil having a solid fat index at 92° F. of less than about 6.

7. The food product of claim 5 wherein said edible oil is an animal fat.

8. The food product of claim 5 wherein said edible oil is a bland hydrogenated vegetable oil selected from the group consisting of hydrogenated coconut oil, corn oil, palm oil, soybean oil, cottonseed oil, safflower oil, and mixtures thereof.

9. The food product of claim 5 wherein said vegetable oil melts in the range of about 80° F. to about 100° F. and has a solid fat index at 92° F. of about 0.

10. A simulated non-cultured food product having substantially the texture, body and eating quality of cheese that is prepared from dry, particulate rennet casein, said food product being prepared by mixing [at least] about 25 percent *to about 60 percent* by weight of said dry, particulate rennet casein as the principal protein source with water, an edible solvation agent in an amount of about 2 percent to about 12 percent by weight, based on said rennet casein, said solvation agent being selected from the group consisting of disodium phosphate, trisodium phosphate, sodium hexametaphosphate, sodium tripolyphosphate, tetrasodium phosphate, the sodium aluminum [phosphate] *phosphates*, dipotassium phosphate, monosodium diphosphate, trisodium diphosphate, tetrasodium diphosphate, monosodium citrate, disodium citrate, trisodium citrate and mixtures thereof, with an edible lipid material selected from the group consisting of a fat and an oil, and with sufficient quantities of flavoring agents and acidulants to impart to said product the desired flavor and pH, the mixture so formed being agitated under high shear and heating at a temperature of about 190° F. to about 205° F., and being maintained with sufficient severity of shearing agitation at said temperature for a time period of about [2] *3* minutes [to about 4 minutes] to solvate the rennet casein that is present to provide a plastic body to said food product, said food product being substantially free of unsolvated rennet casein particles.

[11. The food product of claim 10 wherein said rennet casein is present in an amount of about 25 to about 65 percent by weight.]

12. The food product of claim 10 wherein said edible lipid material is a hydrogenated vegetable oil present in an amount of at least about 7 percent by weight of the composition.

13. The food product of claim 10 wherein said edible lipid material is a hydrogenated vegetable oil present in an amount of about 7 percent to about 55 percent by weight of the composition.

14. The food product of claim 12 wherein said hydrogenated vegetable oil melts in the range of about 50° F. to about 100° F. and has a solid fat index at 92° F. of less than about 6.

15. The food product of claim 10 wherein said edible lipid material is a hydrogenated vegetable oil selected from the group consisting of hydrogenated coconut oil, corn oil, palm oil, soybean oil, cottonseed oil, safflower oil and mixtures thereof.

16. The food product of claim 10 wherein water is present in an amount of about 30 percent to about 60 percent by weight of the composition.

17. The food product of claim 10 wherein the flavoring agent is starter distillate.

18. The food product of claim 17 wherein said starter distillate is present in an amount of about 0.3 percent to about 0.5 percent by weight of said product.

19. The food product of claim [17] *36* wherein the flavoring agent [additionally] comprises *a starter distillate and* an acidulant in sufficient quantities to provide a product having a pH of about 5.4 to about 6.5.

20. The food product of claim 10 wherein the flavoring agent is solvated from the group consisting of starter distillate, a $C_1$–$C_8$ carboxylic acid, and mixtures thereof.

21. The food product of claim 20 wherein said flavoring agent is present in an amount of about 10 to about 1500 parts per million parts of said product.

22. The food product of claim [21] *36* wherein [said] *the* flavoring agent *is selected from the group consisting of starter distillate, a $C_1$–$C_8$ carboxylic acid and mixtures thereof, is present in an amount from about 10 to about 1500 parts per million parts of said product and* additionally comprises sufficient acidulant to provide a product having a pH of about 5.4 to about 6.5.

23. The food product of claim 21 wherein said flavoring agent additionally comprises sufficient acidulant to provide a product having a pH of about 5.5 to about 5.8.

24. The food product of claim 10 wherein said solvated rennet casein has a lactose content of about 0.1 percent to about 0.3 percent by weight, and a particle size of about 30 mesh.

25. A simulated, non-cultured food product having substantially the texture, body and eating quality of cheese from dry, particulate rennet casein comprising an admixture of an edible mass with a bland, edible lipid material selected from the group consisting of fat and oil, and sufficient quantities of flavoring agents and acidulants to impart desired flavor and pH value to said admixture, said lipid material being present in an amount of about 7 to about 55 weight percent of said admixture, said food product being formed by heating said admixture to a temperature of about 150° F. to about 300° F. with agitation, and maintaining said admixture at said temperature with agitation, said edible mass being made by admixing dry, particulate rennet casein as the principal source of protein, water and an edible solvation agent in an amount of about 2 to about 12 percent by weight of said rennet casein, said solvation agent being selected from the group consisting of disodium phosphate, trisodium phosphate, sodium hexametaphosphate, sodium tripolyphosphate, tetrasodinm phosphate, the sodium aluminum phosphates, dipotassium phosphate, monosodium diphosphate, trisodium diphosphate, tetrasodium diphosphate, monosodium citrate, disodium citrate, trisodium citrate and mixtures thereof, said admixture being heated with high shearing agitation to a temperature of about 190° F. to about 205° F. and being maintained at said temperature and with sufficient severity of shearing agitation for a time period of about 2 minutes to about 4 minutes to solvate rennet casein and form said edible mass having a plastic body, said rennet casein comprising at least about 25 weight percent of said edible mass, and said edible mass being substantially free of discernible rennet casein particles.

26. A process of preparing a substantially homogeneous, aqueous, edible mass [which comprises] *consisting of:* admixing dry, particulate edible rennet casein, water, and an edible solvation agent selected from the group consisting of disodium phosphate, trisodium phosphate, sodium hexametaphosphate, sodium tripolyphosphate, tetrasodium phosphate, the sodium aluminum phosphates, dipotassium phosphate, monosodium diphosphate, trisodium diphosphate, tetrasodium diphosphate, monosodium citrate, disodium citrate, trisodium citrate and mixtures thereof so as to produce a substantially uniform admixture containing at least about 25 percent rennet casein [as the principal protein source], about 2 percent to about 12 percent by weight of the rennet casein of said edible solvation agent and water;

heating the resulting admixture, with high shearing agitation, to a temperature of about 190° F. to about 205° F.; and maintaining said admixture at said temperature with a sufficient severity of shearing agitation for a time period of about 2 minutes to about 4 minutes to solvate the rennet casein and to provide a plastic body to said edible mass, said edible mass being substantially free of discernible rennet casein particles.

27. The process in accordance with claim 26 wherein said admixture contains about 25 percent to about 65 percent of edible rennet casein.

28. A process of preparing a substantially homogeneous, aqueous, edible mass [which comprises] *consisting of:* admixing dry, particulate edible rennet casein [as the principal protein source], water, and an edible solvation agent selected from the group consisting of disodium phosphate, trisodium phosphate, sodium hexametaphosphate, sodium tripolyphosphate, tetrasodium phosphate, the sodium aluminum phosphates, dipotassium phosphate, monosodium diphosphate, trisodium diphosphate, tetrasodium diphosphate, monosodium citrate, disodium citrate, trisodium citrate and mixtures thereof so as to produce a substantially uniform admixture containing about 30 to about 45 percent of said edible rennet casein, about 2 percent to about 12 percent by weight of the rennet casein of said edible solvation agent, and water;

heating the resulting admixture, with high shearing agitation, to a temperature of about 190° F. to about 205° F.; and maintaining said admixture at said temperature for a time period of about 2 minutes to about 4 minutes to solvate the rennet casein and to provide a plastic body to the edible mass, said edible mass being substantially free of discernible rennet casein particles.

29. A process of preparing a simulated, non-cultured food product having substantially the texture, body and eating quality of cheese from dry, particulate rennet casein comprising admixing dry, particulate rennet casein as the principal source of protein, water, and an edible solvation agent in an amount of about 2 to about 12 percent by weight of said rennet casein, said solvation agent being selected from the group consisting of disodium phosphate, trisodium phosphate, sodium hexametaphosphate, sodium tripolyphosphate, tetrasodium phosphate, the sodium aluminum phosphates, dipotassium phosphate, monosodium diphosphate, trisodium diphosphate, tetrasodium diphosphate, monosodium citrate, disodium citrate, trisodium citrate and mixtures thereof, heating the resulting admixture with high shearing agitation to a temperature of about 190° F. to about 205° F. and maintaining said admixture at said temperature with sufficient severity of shearing agitation for a time period of about 2 minutes to about 4 minutes to solvate said rennet casein to form an edible mass having a plastic body, said rennet casein comprising at least about 25 weight percent of said edible mass, and said edible mass being substantially free of discernible rennet casein particles;

admixing with said edible mass a bland, edible lipid material selected from the group consisting of fat and oil and sufficient quantities of flavoring agents and acidulants to impart desired flavor and pH value to form a new admixture, said lipid material being present in an amount of about 7 to about 55 weight percent of said new admixture; and heating said new admixture to a temperature of about 150° F. to about 300° F. with agitation, and maintaining said new admixture at said temperature with agitation to produce said food product.

30. The process of claim 29 wherein said lipid material is a hydrogenated vegetable oil and is present at about 20 to about 30 weight percent of the [total compositions] *new admixture*.

31. [The] *A* process of preparing a simulated, non-cultured food product having substantially the texture, body and eating quality of cheese from dry, particulate rennet casein, said process comprising mixing in water [at least] about 25 percent *to about 60 percent* by weight of said dry, particulate rennet casein as the principal protein source with an edible solvation agent in an amount of about 2 percent to about 12 percent by weight, based on said rennet casein, said solvation agent being selected from the group consisting of disodium phosphate, trisodium phosphate, sodium hexametaphosphate, sodium tripolyphosphate, tetrasodium phosphate, the sodium aluminum phosphates, dipotassium phosphate, monosodium diphosphate, trisodium diphosphate, tetrasodium diphosphate, monosodium citrate, disodium citrate, trisodium citrate and mixtures thereof, with an edible lipid material selected from the group consisting of a fat and an oil, and with sufficient quantities of flavoring agents and acidulants to impart to said product the desired flavor and pH, agitating under high shear and heating the produced mixture to a temperature of about 190° F. to about 205° F., and maintaining the mixture with sufficient severity of shearing agitation at such temperature for a time period of about [2] *3* minutes [to about 4 minutes] to solvate the rennet casein that is present to provide a plastic body to said food product, said food product being substantially free of unsolvated rennet casein particles.

*32. A substantially homogeneous, aqueous, edible mass which comprises solvated edible rennet casein as the principal protein source prepared by solvation of dry particulate rennet casein in water in the presence of an edible solvation agent at a temperature of about 190° F. to about 205° F. and under high shearing agitation at the temperature of solvation for a time period of about 2 minutes to about 4 minutes to provide a plastic body to said edible mass, said particulate rennet casein constituting at least 25 percent by weight of said edible mass, water, and said edible solvation agent being present in an amount of about 3 to about 6 percent by weight of the particulate rennet casein, said edible solvation agent being selected from the group consisting of disodium phosphate, trisodium phosphate, sodium hexametaphosphate, sodium tripolyphosphate, tetrasodium phosphate, the sodium aluminum phosphates, dipotassium phosphate, monosodium diphosphate, trisodium diphosphate, tetrasodium diphosphate, monosodium citrate, disodium citrate, trisodium citrate and mixtures thereof, said edible mass being substantially free of discernible rennet casein particles.*

*33. The edible mass in accordance with claim 32 wherein the rennet casein is present in an amount of about 25 percent to about 65 percent by weight.*

*34. A substantially homogeneous, aqueous, edible mass which comprises solvated edible rennet casein as the principal protein source prepared by solvation of dry particulate rennet casein in water in the presence of an edible solvation agent at a temperature of about 190° F. to about 205° F. and under high shearing agitation at the temperature of solvation for a time period of about 2 minutes to about 4 minutes to provide a plastic body to said edible mass, said particulate rennet casein constituting about 30 percent to about 45 percent by weight of said edible mass, water, and said edible solvation agent being present in an amount of about 3 to about 6 percent by weight of the particulate rennet casein, said edible solvation agent being selected from the group consisting of disodium phosphate, trisodium phosphate, sodium hexametaphosphate, sodium tripolyphosphate, tetrasodium phosphate, the sodium aluminum phosphates, dipotassium phosphate, monosodium diphosphate, trisodium diphosphate, tetrasodium diphosphate, monosodium citrate, disodium citrate, trisodium citrate and mixtures thereof, said edible mass being substantially free of discernible rennet casein particles.*

*35. A non-cultured simulated cheese product having generally the texture, body and eating quality of cheese which is a substantially homogeneous mass comprising solvated edible rennet casein as the principal protein source, said solvated edible rennet casein having been prepared by solvation of dry particulate rennet casein in water in the presence of an edible solvation agent at a temperature of about 190° F. to about 205° F. and under high shearing agitation at the temperature of solvation for a period of time of about 2 minutes to about 4 minutes to provide plastic body to said food product, said particulate rennet casein constituting about 30 percent to about 45 percent by weight of said*

*simulated cheese, said edible solvation agent being selected from the group consisting of disodium phosphate, trisodium phosphate, sodium hexametaphosphate, sodium tripolyphosphate, tetrasodium phosphate, the sodium aluminum phosphates, dipotassium phosphate, monosodium diphosphate, trisodium diphosphate, tetrasodium diphosphate, monosodium citrate, disodium citrate, trisodium citrate and mixtures thereof, and being present in an amount of about 3 to about 6 percent by weight of said particulate rennet casein, water, a bland, edible lipid material selected from the group consisting of oil and fat, and sufficient quantities of suitable flavoring agents to impart the desired flavor, said food product being substantially free of unsolvated rennet casein particles.*

*36. A simulated non-cultured food product having substantially the texture, body and eating quality of cheese that is prepared from dry, particulate rennet casein, said food product being prepared by mixing at least about 25 percent by weight of said dry, particulate rennet casein as the principal protein source with water, an edible solvation agent in an amount of about 3 percent to about 6 percent by weight, based on said rennet casein, said solvation agent being selected from the group consisting of disodium phosphate, trisodium phosphate, sodium hexametaphosphate, sodium tripolyphosphate, tetrasodium phosphate, the sodium aluminum phosphates, dipotassium phosphate, monosodium diphosphate, trisodium diphosphate, tetrasodium diphosphate, monosodium citrate, disodium citrate, trisodium citrate and mixtures thereof, with an edible lipid material selected from the group consisting of a fat and an oil, and with sufficient quantities of flavoring agents and acidulants to impart to said product the desired flavor and pH, the mixture so formed being agitated under high shear and heating at a temperature of about 190° F. to about 205° F., and being maintained with sufficient severity of shearing agitation at said temperature for a time period of about 2 minutes to about 4 minutes to solvate the rennet casein that is present to provide a plastic body to said food product, said food product being substantially free of unsolvated rennet casein particles.*

*37. A simulated, non-cultured food product having substantially the texture, body and eating quality of cheese from dry, particulate rennet casein comprising an admixture of an edible mass with a bland, edible lipid material selected from the group consisting of fat and oil, and sufficient quantities of flavoring agents and acidulants to impart desired flavor and pH value to said admixture, said lipid material being present in an amount of about 7 to about 55 weight percent of said admixture, said food product being formed by heating said admixture to a temperature of about 150° F. to about 300° F. with agitation, and maintaining said admixture at said temperature with agitation, said edible mass being made by admixing dry, particulate rennet casein as the principal source of protein, water and an edible solvation agent in an amount of about 3 to about 6 percent by weight of said rennet casein, said solvation agent being selected from the group consisting of disodium phosphate, trisodium phosphate, sodium hexametaphosphate, sodium tripolyphosphate, tetrasodium phosphate, the sodium aluminum phosphates, dipotassium phosphate, monosodium diphosphate, trisodium diphosphate, tetrasodium diphosphate, monosodium citrate, disodium citrate, trisodium citrate and mixtures thereof, said admixture being heated with high shearing agitation to a temperature of about 190° F. to about 205° F. and being maintained at said temperature and with sufficient severity of shearing agitation for a time period of about 2 minutes to about 4 minutes to solvate said rennet casein and form said edible mass having a plastic body, said rennet casein comprising at least about 25 weight percent of said edible mass, and said edible mass being substantially free of discernible rennet casein particles.*

*38. A process of preparing a substantially homogeneous, aqueous, edible mass which comprises:*

*admixing dry, particulate edible rennet casein, water, and an edible solvation agent selected from the group consisting of disodium phosphate, trisodium phosphate, sodium hexametaphosphate, sodium tripolyphosphate, tetrasodium phosphate, the sodium aluminum phosphates, dipotassium phosphate, monosodium diphosphate, trisodium diphosphate, tetrasodium diphosphate, monosodium citrate, disodium citrate, trisodium citrate and mixtures thereof so as to produce a substantially uniform admixture containing at least about 25 percent rennet casein as the principal protein source, about 3 percent to about 6 percent by weight of the rennet casein of said edible solvation agent and water;*

*heating the resulting admixture, with high shearing agitation, to a temperature of about 190° F. to about 205° F.; and*

*maintaining said admixture at said temperature with sufficient severity of shearing agitation for a time period of about 2 minutes to about 4 minutes to solvate the rennet casein and to provide a plastic body to said edible mass, said edible mass being substantially free of discernible rennet casein particles.*

*39. The process in accordance with claim 38 wherein said admixture contains about 25 percent to about 65 percent of edible rennet casein.*

*40. A process of preparing a substantially homogeneous, aqueous, edible mass which comprises:*

*admixing dry, particulate edible rennet casein as the principal protein source, water, and an edible solvation agent selected from the group consisting of disodium phosphate, trisodium phosphate, sodium hexametaphosphate, sodium tripolyphosphate, tetrasodium phosphate, the sodium aluminum phosphates, dipotassium phosphate, monosodium diphosphate, trisodium diphosphate, tetrasodium diphosphate, monosodium citrate, disodium citrate, trisodium citrate and mixtures thereof so as to produce a substantially uniform admixture containing at least about 30 to about 45 percent of said edible rennet casein, about 3 percent to about 6 percent by weight of the rennet casein of said edible solvation agent and water;*

*heating the resulting admixture, with high shearing agitation, to a temperature of about 190° F. to about 205° F.; and*

*maintaining said admixture at said temperature for a time period of about 2 minutes to about 4 minutes to solvate the rennet casein and to provide a plastic body to the edible mass, said edible mass being substantially free of discernible rennet casein particles.*

*41. A process of preparing a simulated, non-cultured food product having substantially the texture, body and eating quality of cheese from dry, particulate rennet casein comprising:*

*admixing dry, particulate rennet casein as the principal source of protein, water and an edible solvation agent in an amount of about 3 to about 6 percent by weight of said rennet casein, said solvation agent being selected from the group consisting of disodium*

*phosphate, trisodium phosphate, sodium hexametaphosphate, sodium tripolyphosphate, tetrasodium phosphate, the sodium aluminum phosphates, dipotassium phosphate, monosodium diphosphate, trisodium diphosphate, tetrasodium diphosphate, monosodium citrate, disodium citrate, trisodium citrate and mixtures thereof, heating the resulting admixture with high shearing agitation to a temperature of about 190° F. to about 205° F. and maintaining said admixture at said temperature with sufficient severity of shearing agitation for a time period of about 2 minutes to about 4 minutes to solvate said rennet casein to form an edible mass having a plastic body, said rennet casein comprising at least about 25 weight percent of said edible mass, and said edible mass being substantially free of discernible rennet casein particles;*

*admixing with said edible mass a bland, edible lipid material selected from the group consisting of fat and oil and sufficient quantities of flavoring agents and acidulants to impart desired flavor and pH value to form a new admixture, said lipid material being present in an amount of about 7 to about 55 weight percent of said new admixture; and*

*heating said new admixture to a temperature of about 150° F. to about 300° F. with agitation, and maintaining said new admixture at said temperature with agitation to produce said food product.*

*42. The process of claim 41 wherein said lipid material is a hydrogenated vegetable oil and is present at about 20 to about 30 weight percent of the new admixture.*

*43. A process of preparing a simulated, non-cultured food product having substantially the texture, body and eating quality of cheese from dry, particulate rennet casein, said process comprising mixing in water at least about 25 percent by weight of said dry, particulate rennet casein as the principal protein source with an edible solvation agent in an amount of about 3 percent to about 6 percent by weight, based on said rennet casein, said solvation agent being selected from the group consisting of disodium phosphate, trisodium phosphate, sodium hexametaphosphate, sodium tripolyphosphate, tetrasodium phosphate, the sodium aluminum phosphates, dipotassium phosphate, monosodium diphosphate, trisodium diphosphate, tetrasodium diphosphate, monosodium citrate, disodium citrate, trisodium citrate and mixtures thereof, with an edible lipid material selected from the group consisting of a fat and an oil, and with sufficient quantities of flavoring agents and acidulants to impart to said product the desired flavor and pH, agitating under high shear and heating the produced mixture to a temperature of about 190° F. to about 205° F., and maintaining said mixture with sufficient severity of shearing agitation at such temperature for a time period of about 2 minutes to about 4 minutes to solvate the rennet casein that is present to provide a plastic body to said food product, said food product being substantially free of unsolvated rennet casein particles.*

*44. The edible mass of claim 1 wherein the water comprises about 46 percent to about 67.6 percent of the edible mass.*

*45. The product made by the process of claim 29.*

* * * * *